(12) United States Patent
Holman et al.

(10) Patent No.: US 6,169,827 B1
(45) Date of Patent: Jan. 2, 2001

(54) MICRO-OPTIC SWITCH WITH LITHOGRAPHICALLY FABRICATED POLYMER ALIGNMENT FEATURES FOR THE POSITIONING OF SWITCH COMPONENTS AND OPTICAL FIBERS

(75) Inventors: Jason Holman, Waltham, MA (US); Stephen M. Emo, Elkhart, IN (US); Robert A. Norwood, West Chester, PA (US); Lawrence W. Shacklette, Maplewood, NJ (US)

(73) Assignee: Honeywell International Inc., Morristown, NJ (US)

( * ) Notice: Under 35 U.S.C. 154(b), the term of this patent shall be extended for 0 days.

(21) Appl. No.: 09/390,113

(22) Filed: Sep. 3, 1999

(51) Int. Cl.[7] .................................................. G02B 6/26

(52) U.S. Cl. ........................ 385/22; 385/16; 385/20; 385/21; 385/23

(58) Field of Search ..................... 385/15–17, 20–23, 385/65

(56) References Cited

U.S. PATENT DOCUMENTS

| 4,204,744 | 5/1980 | Wittmann . | |
|---|---|---|---|
| 5,378,583 | 1/1995 | Guckel et al. | 430/325 |
| 5,479,541 | 12/1995 | Pan | 385/22 |
| 5,796,888 | * 8/1998 | Furukawa et al. | 385/22 |
| 5,808,384 | 9/1998 | Tabat et al. | 310/40 MM |
| 5,866,281 | 2/1999 | Guckel et al. | 430/22 |
| 6,044,186 | * 3/2000 | Chang et al. | 385/23 |

OTHER PUBLICATIONS

Norwood, R.A., et al "Fast,low insertion loss optical switch using lithographically defined electromagnetic microactuators and polymeric passive alignment structures" Applied Physics Letters; vol. 73, No. 22; Nov. 30, 1998.

Nagaoka, Shinji, et al, "Compact Optomechanical Switches and their Applications in Optical Communications and Testing Systems" (No Date).

Nagaoka, Shinji "Fabrication of Micropipes and their application to Single Mode Fiber Switching and Splicing"; IEICE Trans. Electron. vol. E–80C, No. 2, Feb. 1997.

Nagaoka, Shinji, "Compact Latching Type Single–Mode Fiber Switches and Their Application in Subscriber Loop Networks"; IEICE Trans. Electron. vol. E–80C, No. 1, Jan. 1997.

Makihara, Mitsujiro, et al; "Self–Holding Optical Waveguide Switch Controlled by Micromechanisms" IEICE Trans. Electron. vol. E–80C, No. 2, Feb. 1997.

* cited by examiner

Primary Examiner—James Phan
(74) Attorney, Agent, or Firm—John G. Shudy, Jr.

(57) ABSTRACT

The invention relates to a micro-optic switch used for transmitting optical signals between optical fibers. More particularly, the invention pertains to a micro-optic switch using polymer structures to position a microactuator and optical fibers on a substrate so that the microactuator can move an optical fiber cantilever between two fixed fibers to transmit optical signals between either one of the fixed fibers and the cantilever fiber. Using polymers instead of micromachined structures to position components of the switch reduces cost and simplifies assembly. The invention further provides processes for producing a micro-optic switch and for switching the path of an optical signal.

39 Claims, 10 Drawing Sheets

MICRO-OPTIC SWITCH WITH LITHOGRAPHICALLY FABRICATED POLYMER ALIGNMENT FEATURES FOR THE POSITIONING OF SWITCH COMPONENTS AND OPTICAL FIBERS

BACKGROUND OF THE INVENTION

1. Field of the Invention

The invention relates to a micro-optic switch used for transmitting optical signals between optical fibers. More particularly, the invention pertains to a micro-optic switch using polymer structures to position a microactuator and optical fibers on a substrate so that the microactuator can move an optical fiber cantilevered between two fixed fibers to transmit optical signals between either one of the fixed fibers and the cantilever fiber. Using polymers instead of micromachined structures to position components of the switch reduces cost and simplifies assembly. The invention further provides processes for producing a micro-optic switch and for switching the path of an optical signal.

2. Description of the Related Art

Recent developments in the area of optical communications have provided a large number of devices for the control and routing of light. These devices can be characterized as passive devices, those which serve only to route the propagation of light along a particular path, and active devices, those which control some function of the propagating light, such as the path along which the light propagates. Optical fibers have been the medium of choice in the field of optical communications for long distance propagation of light due to their excellent transmission characteristics and ability to be fabricated in lengths of many kilometers.

Light propagates through the core region of optical fibers and these core regions can be as small as a few microns in diameter. A key component in a reliable optical fiber communication system is an optomechanical switch which is optically connected to light conducting fibers and enables different communication paths to be interconnected. For example, U.S. Pat. No. 5,479,541 discloses an optical switch having a first optical fiber which forms an optical path with additional optical fibers, wherein lenses are attached to the ends of each optical fiber to collimate light beams and assist in the transmission optical data between fibers. Also, U.S. Pat. No. 4,204,744 discloses a switch for optically connecting light conducting fibers utilizing a magnetic sleeve adjacent to a free moving fiber which enables the alignment of a pole fiber with at least one throw fiber.

It is known in the art to produce metal micro-electro-mechanical-systems (MEMS) and micro-optical-electro mechanical systems (MOEMS) including components of micro-optic switches by the LIGA process. LIGA is a German language acronym for Lithographie, Galvanoformung and Abformung, the main steps of a process employing X-ray lithography, electro forming and plastic molding to produce microcomponents of a micro-optic switch. The original idea of LIGA-MEMS was to make metal tooling from which mass replicates could be made from plastic. Since switches using electrostatics or electromagnetics require metal parts, these parts are made by the electro forming step. Polymer replicates are generally not used. Using LIGA-MEMS technology to fabricate micro-optic metal switch parts is an expensive process. In order to minimize the cost of a micro-optic switch, it is beneficial to make as much of the switch as possible with polymer components, and only use metal LIGA-MEMS components for those parts of the switch where they are necessary for actuation or to assure high levels of performance. The present invention provides such a low cost micro-optic switch having polymeric parts and a process by which the switch can be made.

The micro-optic switch of the present invention has the advantages of a MEMS device, such as small size, low power consumption, high speed, and excellent optical properties, without the high cost of a device made completely from LIGA-MEMS technology. The switch uses lithographically defined polymer structures to position both the MEMS components, such as actuators, and the ancillary components, such as optical fibers, which must interact with those MEMS components. Costs are reduced because only the portions of the switch which have special functions, and therefore need to be made by MEMS processes, are not made of polymer. In addition, a variety of substrates may be used, and the substrate material can be tailored to reduce costs and provide additional stability. Furthermore, this approach provides for straightforward integration with other optic components such as polymer waveguides and filters.

SUMMARY OF THE INVENTION

The invention provides a micro-optic switch comprising:
a) a planar substrate;
b) at least one array comprising:
  first and second optical fiber grippers on the substrate, each of the grippers having a central groove and the first and second optical fiber grippers being positioned such that the grooves are substantially collinear; and an optical fiber alignment bumper on the substrate having a central groove, being positioned such that the groove is substantially collinear with the grooves of the first and second optical fiber grippers;
c) at least two horizontally spaced throw optical fibers fixed in the groove of each second optical fiber gripper; and
d) at least one pole optical fiber fixed in each first optical fiber gripper such that it cantilevers over the substrate and extends at least part of the way through the groove of the alignment bumper, such that an end thereof is capable of alternate positioning in alignment with a complementary end of one of the throw fibers.

The invention also provides a process for producing a micro-optic switch comprising:
a) providing a planar substrate; and
b) forming at least one array comprising lithographically forming first and second optical fiber grippers on the substrate, each of the grippers having a central groove and the first and second optical fiber grippers being positioned such that the grooves are substantially collinear; and simultaneously lithographically forming an optical fiber alignment bumper on the substrate having a central groove, being positioned such that the groove is substantially collinear with the grooves of the first and second optical fiber grippers.

The invention further provides a process for switching the path of an optical signal which comprises:
A) providing a micro-optic switch comprising:
  a) a planar substrate;
  b) at least one array comprising:
    first and second optical fiber grippers on the substrate, each of the grippers having a central groove and the first and second optical fiber grippers being positioned such that the grooves are substantially collinear; and an optical fiber alignment bumper on the substrate having a central groove, being positioned such that the groove is substantially collinear with the grooves of the first and second optical fiber grippers;

c) at least two horizontally spaced throw optical fibers fixed in the groove of each second optical fiber gripper;

d) at least one pole optical fiber fixed in each first optical fiber gripper such that it cantilevers over the substrate and extends at least part of the way through the groove of the alignment bumper, such that an end thereof is capable of alternate positioning in alignment with a complementary end of one of the throw fibers; and e) means for alternately positioning the end of the pole optical fiber with an end of one of the throw fibers;

B) directing an optical signal through the pole optical fiber; and

C) alternately positioning the end of the pole optical fiber with an end of one of the throw fibers.

DETAILED DESCRIPTION OF THE PREFERRED EMBODIMENT

Figure 1:
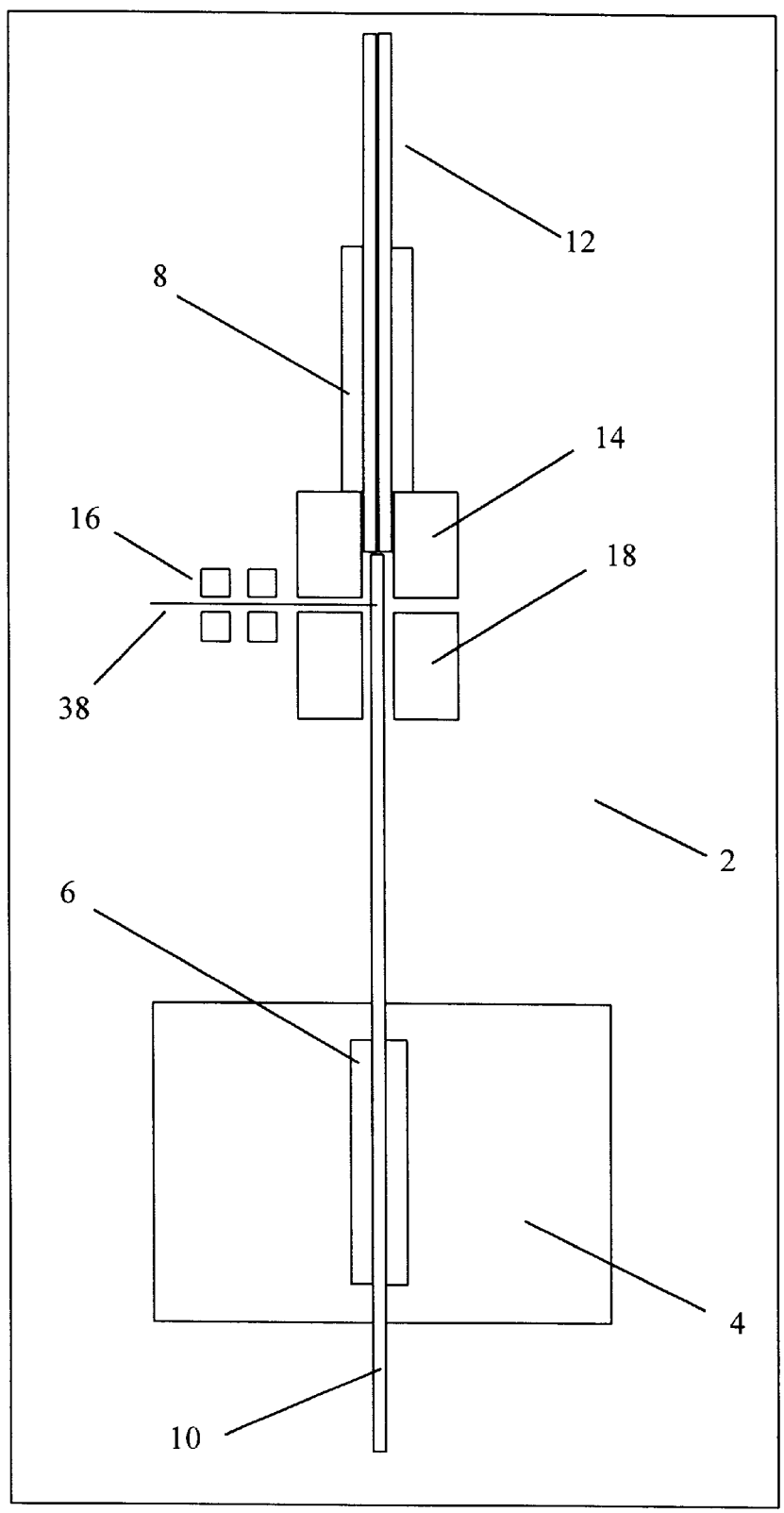
FIG. 1 is an overhead view of a switch embodiment having two alignment bumpers wherein a gripper is attached to a first bumper and the ends of the optical fibers meet within the first bumper.

Each micro-optic switch of this invention employs a combination of LIGA-MEMS technology and lithographically fabricated polymeric elements on a substrate to provide a switch having good performance and low cost. The micro-optic switch of the invention may employ various embodiments depending on the placement of its elements. Referring to FIG. 1, a preferred raised central portion 4, or a plateau, is first formed on a surface of a substrate 2. Lithographically formed on plateau 4 is a first optical fiber gripper 6. First gripper 6 has a central groove and fixed in the groove is a pole optical fiber or fibers 10. The placement of gripper 6 on plateau 4 allows pole fiber or fibers 10 to cantilever over the substrate surface and prevents them from sliding along the substrate so they can move in the switch without friction. Lithographically formed on a surface of the substrate 2 is a second optical fiber gripper 8. Second gripper 8 also has a central groove and fixed in the groove are at least two horizontally spaced throw optical fibers 12, wherein an end or ends of the pole optical fiber or fibers 10 is capable of alternate positioning in alignment with a complementary end or ends of one or more of the throw fibers.

Each gripper 6 and 8 is precisely positioned relative to an actuator means, including an arm 38 for alternately positioning the end of pole fiber or fibers 10 with a complementary end of one of throw fibers 12. Arm 38 engages pole fiber or fibers 10 and allows it to both push and pull the pole fiber. Arm 38 is part of an actuator which is mounted on the substrate by a plurality of polymeric posts 16. Also lithographically formed on a surface of the substrate 2 is an alignment bumper 14 which defines the end limits of the travel of the pole fiber or fibers 10 by stopping the movement of fiber or fibers 10 when they are aligned with an end of a fiber 12. Alignment bumper 14 has a central groove or opening and is positioned such that the groove or opening is substantially collinear with the grooves of grippers 6 and 8, forming an array. The alignment bumpers preferably have an undercut shape which helps to position pole fiber or fibers 10 to a two-point contact against the substrate 2 and the bumper wall when positioned by means 38. Optionally a second alignment bumper 18 may be added to an array to alleviate any torque exerted on the pole fiber when positioned by means 38.

Figure 2:
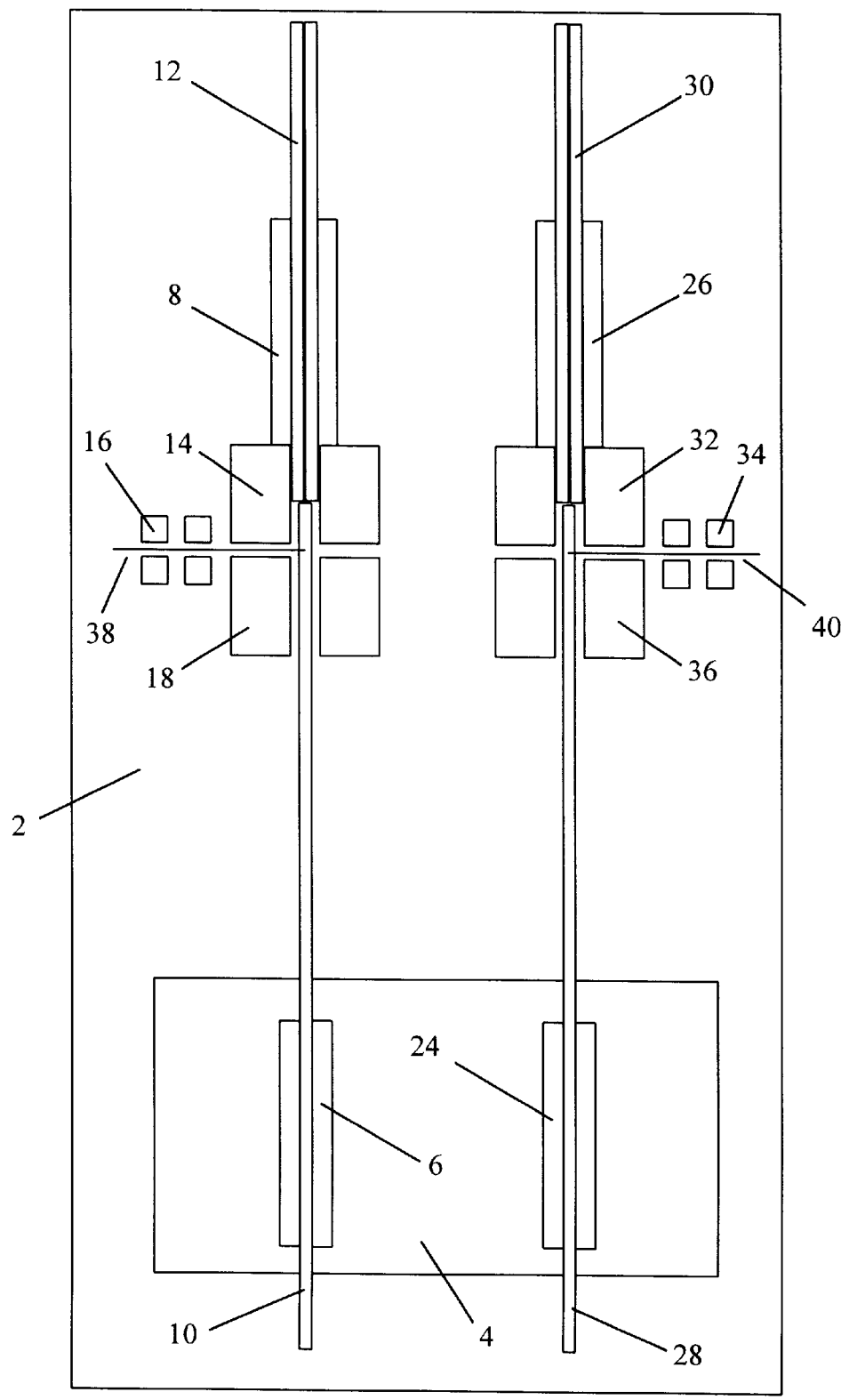
FIG. 2 is an overhead view of an array having two switches wherein each switch shares one raised central portion and the ends of the optical fibers meet within a bumper.

FIG. 1 shows an embodiment having two bumpers and wherein the second gripper 8 is attached to bumper 14. In this embodiment, pole fiber 10 extends at least part of the way through the groove of bumper 14 and is aligned with one of throw fibers 12 within the groove of bumper 14. Also in this embodiment, arm 38 engages pole fiber 10 at a space between bumpers 14 and 18. This is one of many preferred embodiments of the present invention. In an alternate embodiment, one or more additional arrays may be present on a single substrate. Referring to FIG. 2, a second array comprising grippers 24 and 26, bumper 32 and optional bumper 36 is fabricated on a substrate having a single plateau. Pole fiber 28 and throw fibers 30 are positioned in the array such that a second actuator means including arm 40 is used for alternately positioning the end of the pole optical fiber 28 with an end of one of the throw fibers 30. This second means is mounted on the substrate by posts 34, and each of arm 38 and 40 engages their pole fibers at a space between the two alignment bumpers. In this embodiment, each second gripper is attached to the first alignment bumper and each pole fiber extends at least part of the way through the groove of first bumper where it is aligned with one of the throw fibers.

Figure 3:
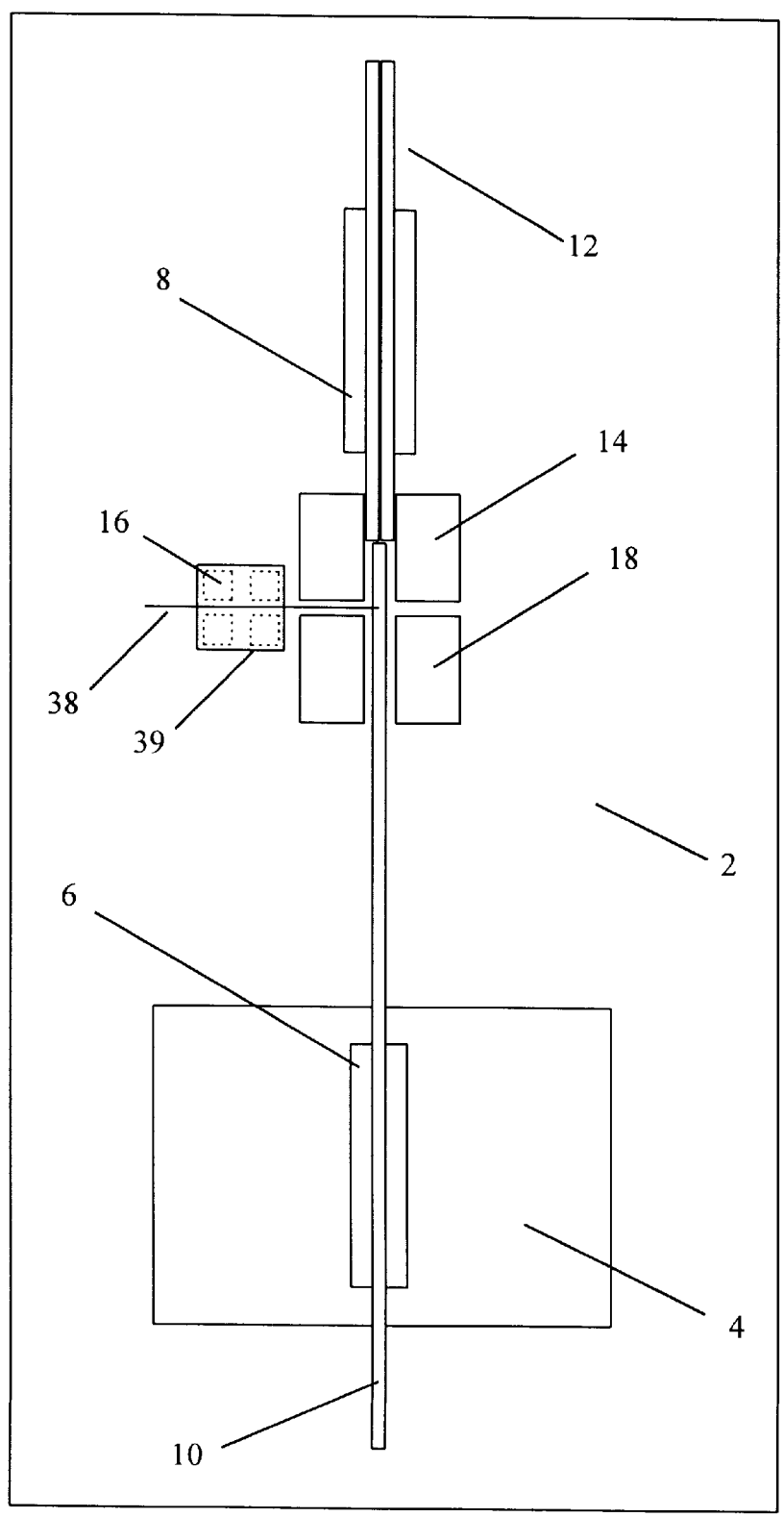
FIG. 3 is an overhead view of a switch having two bumpers and means for alternately positioning the end of a pole optical fiber with the end of a throw fiber, wherein a gripper is spaced from a first bumper, the ends of the optical fibers meet within the first bumper and said means engages the pole fiber between the two bumpers.

Shown in FIG. 3 is an embodiment having two bumpers 14 and 18 and having the second gripper 8 spaced from bumper 14. Pole fiber 10 extends at least part of the way through the groove of bumper 14 where it is aligned with one of the throw fibers 12. In this embodiment, arm 38 engages pole fiber 10 in a space between bumpers 14 and 18, and is a part of a push-pull actuator, 39, which is mounted on posts 16.

Figure 4:
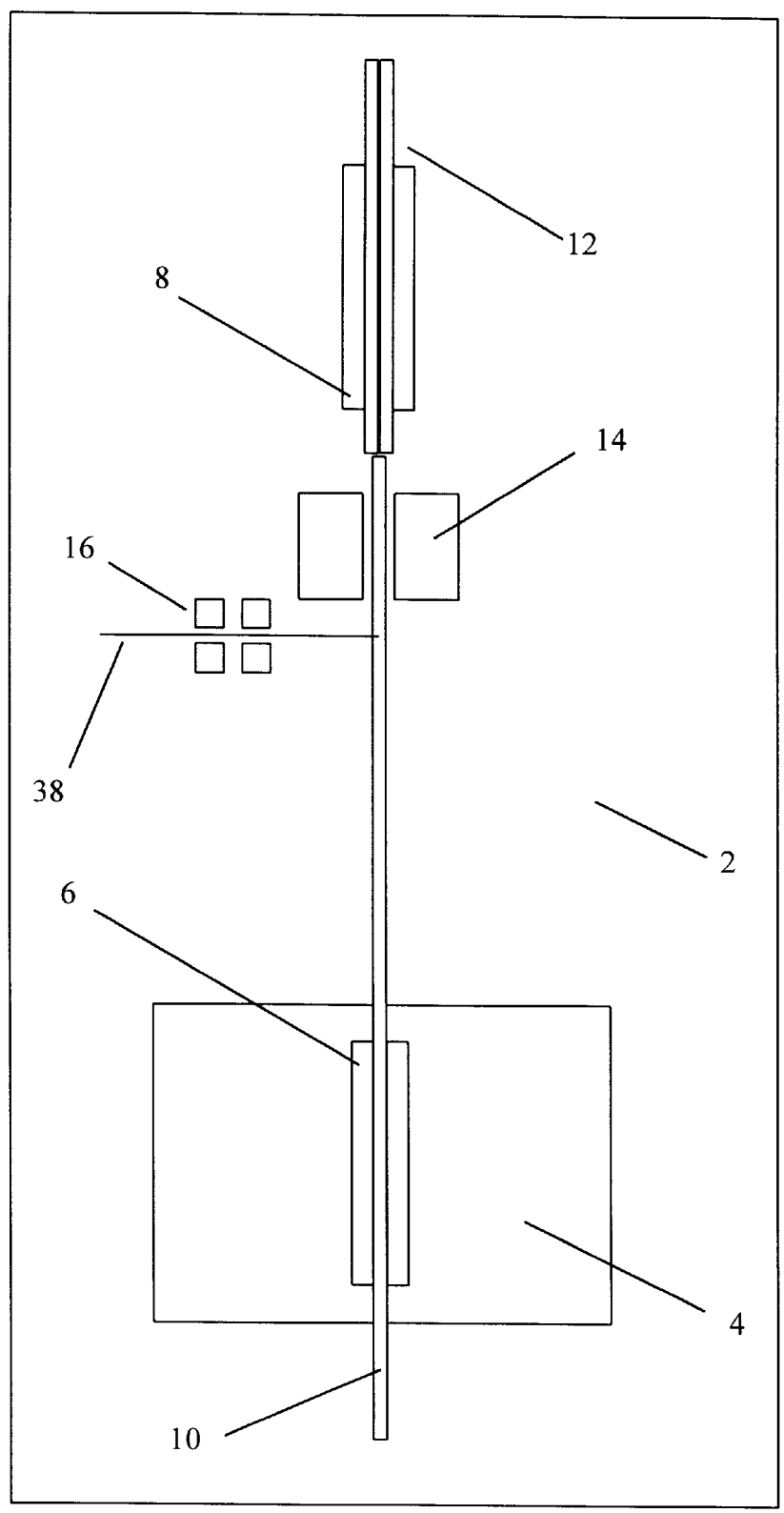
FIG. 4 is an overhead view of a switch having one bumper and means for alternately positioning the end of a pole optical fiber with the end of a throw fiber, wherein the ends of the fibers meet at a space between a second gripper and the bumper, and the means engages the pole fiber between a first gripper and the bumper.

FIG. 4 shows an embodiment having one bumper 14 wherein the second gripper 8 is spaced from the bumper. The pole fiber 10 extends through the bumper 14 and is aligned with one of the throw fibers 12 in the space between the bumper 14 and the second gripper 8. In this embodiment, arm 38 engages pole fiber 10 in a space between the first gripper 6 and the bumper 14.

Figure 5:
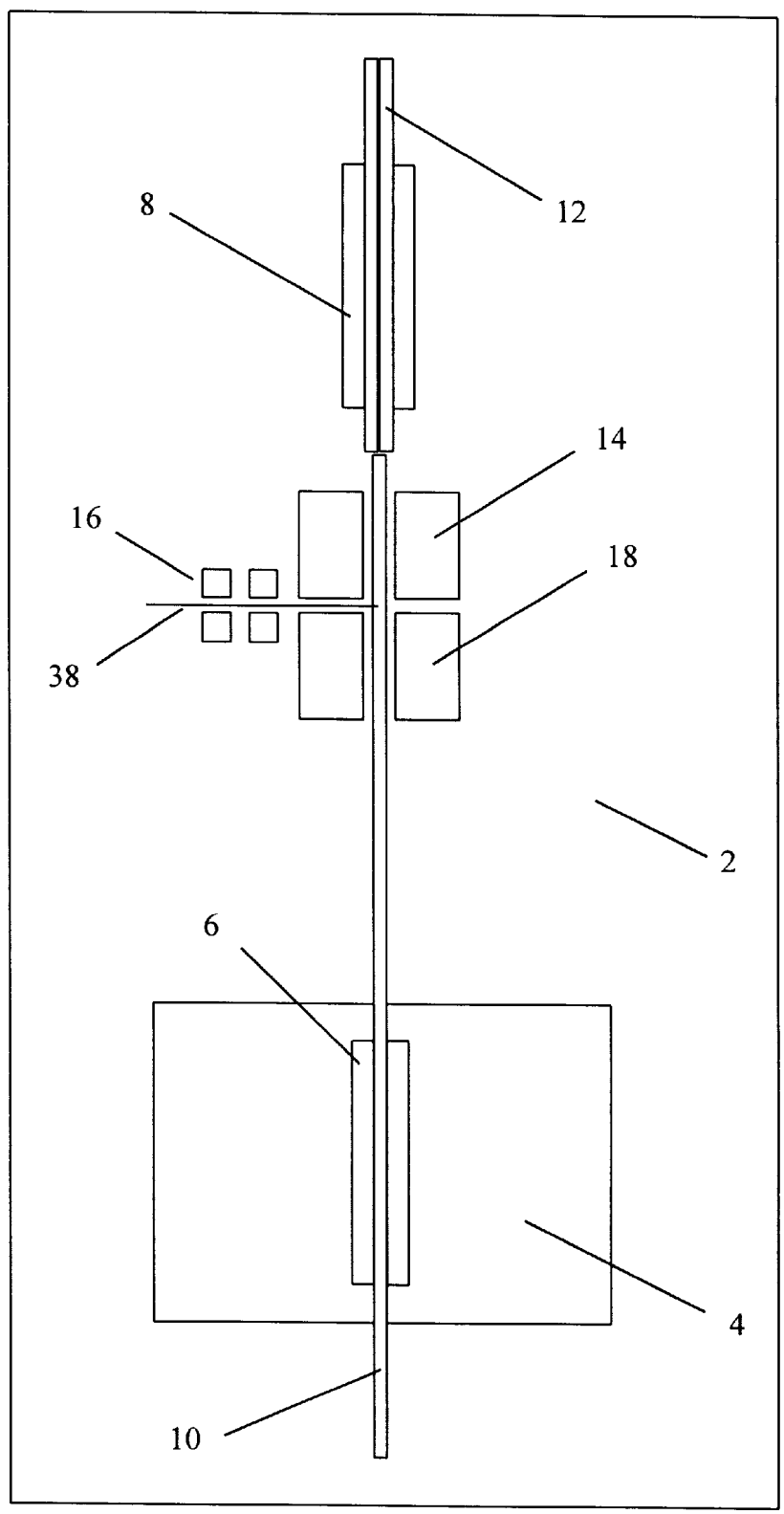
FIG. 5 is an overhead view of a switch having two bumpers and means for alternately positioning the end of a pole optical fiber with the end of a throw fiber, wherein the ends of the fibers meet at a space between a gripper and the first bumper, and the means engages the pole fiber between the two bumpers.

FIG. 5 shows an embodiment having two bumpers 14 and 18 wherein arm 38 engages the pole fiber 10 in a space between the bumpers. This embodiment is similar to the embodiment shown in FIG. 3, but differs in that second gripper 8 is separated from bumper 14 and the pole fiber is aligned with one of the throw fibers 12 in a space between the second gripper 8 and bumper 14.

Figure 6:
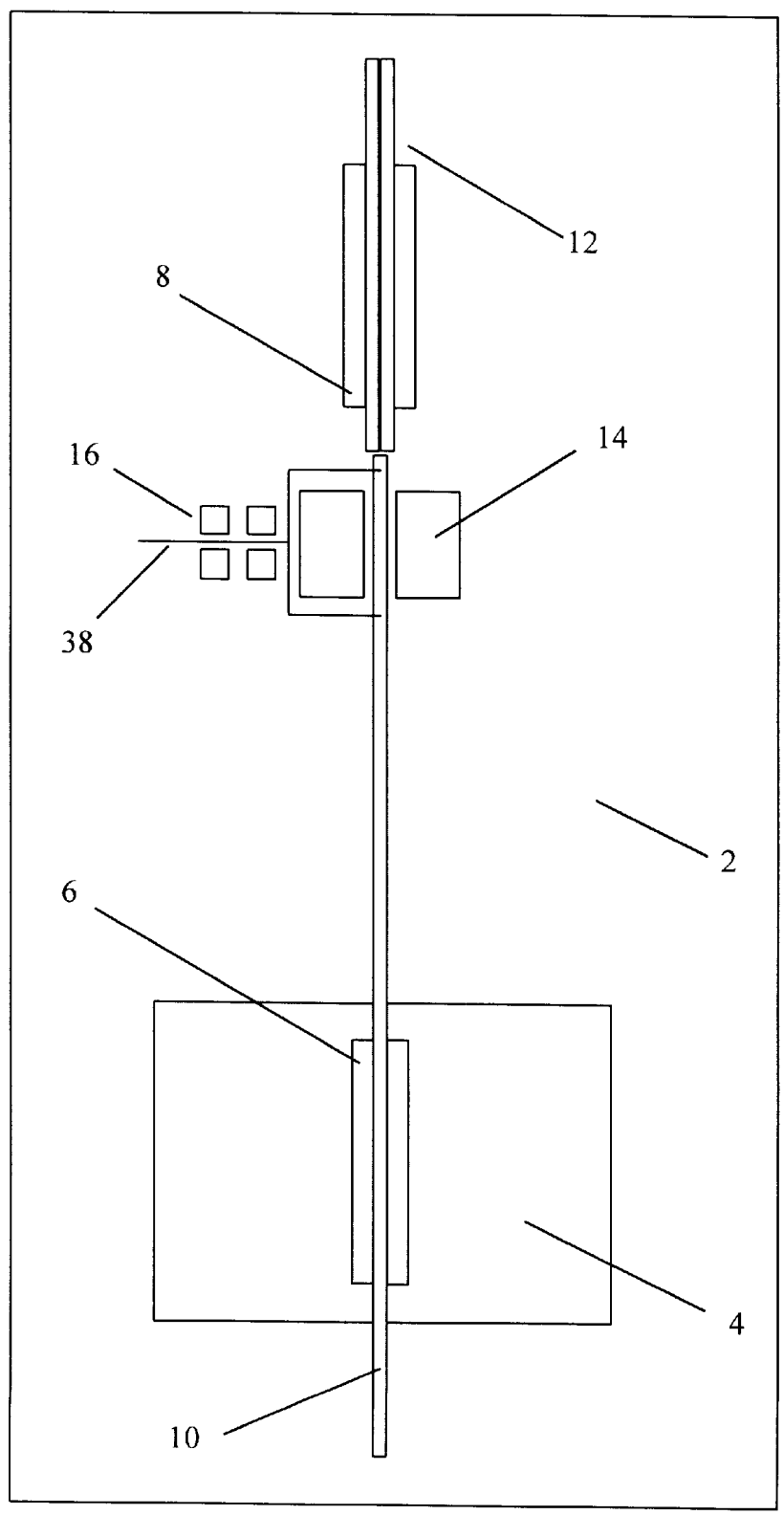
FIG. 6 is an overhead view of a switch having one bumper and means for alternately positioning the end of a pole optical fiber with the end of a throw fiber, wherein the ends of the fibers meet at a space between a gripper and the bumper, and the means engages the pole fiber at opposite sides of the alignment bumper.

FIG. 6 depicts an embodiment having one bumper 14 wherein the second gripper 8 is spaced from the bumper. This embodiment is similar to the embodiment in FIG. 5 in that the pole fiber 10 is aligned with one of the throw fibers 12 in a space between the second gripper 8 and said bumper 14. However, in this embodiment arm 38 engages pole fiber 10 at locations between first gripper 6 and bumper 14 and between the second gripper 8 and the bumper 14. This dual engagement of arm 38 in a single bumper embodiment helps to alleviate any torque exerted on the pole fiber when positioned by arm 38.

Figure 7:
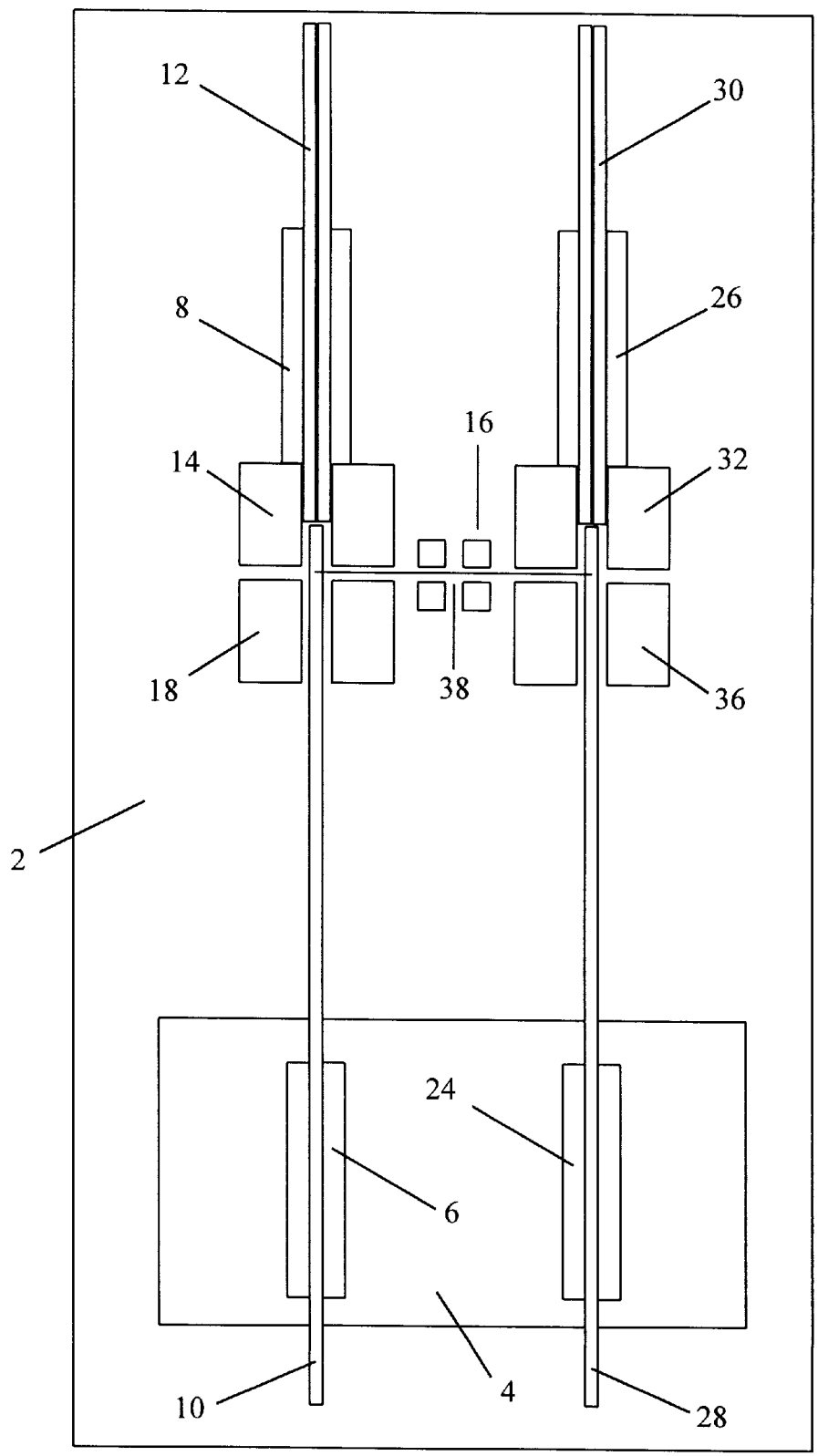
FIG. 7 is an overhead view of an array having two switches wherein each switch is on one raised central portion and having two bumpers wherein the ends of the optical fibers meet within a bumper, and having one means for alternately positioning the end of each pole optical fiber with the end of a corresponding throw fiber wherein the means engages each pole fiber between the two bumpers.

In FIG. 7 is shown an embodiment similar to the embodiment shown in FIG. 2 having a second array on a single substrate having a single plateau. However, in this embodiment a single arm 38 is used to alternately position an end of pole optical fibers 10 and 28 with an end of one of corresponding throw fibers 12 and 30. Having a single means for alternately positioning the fibers allows the movement of the pole fibers to correspond to one another, and requires only a single push-pull actuator.

Figure 8:
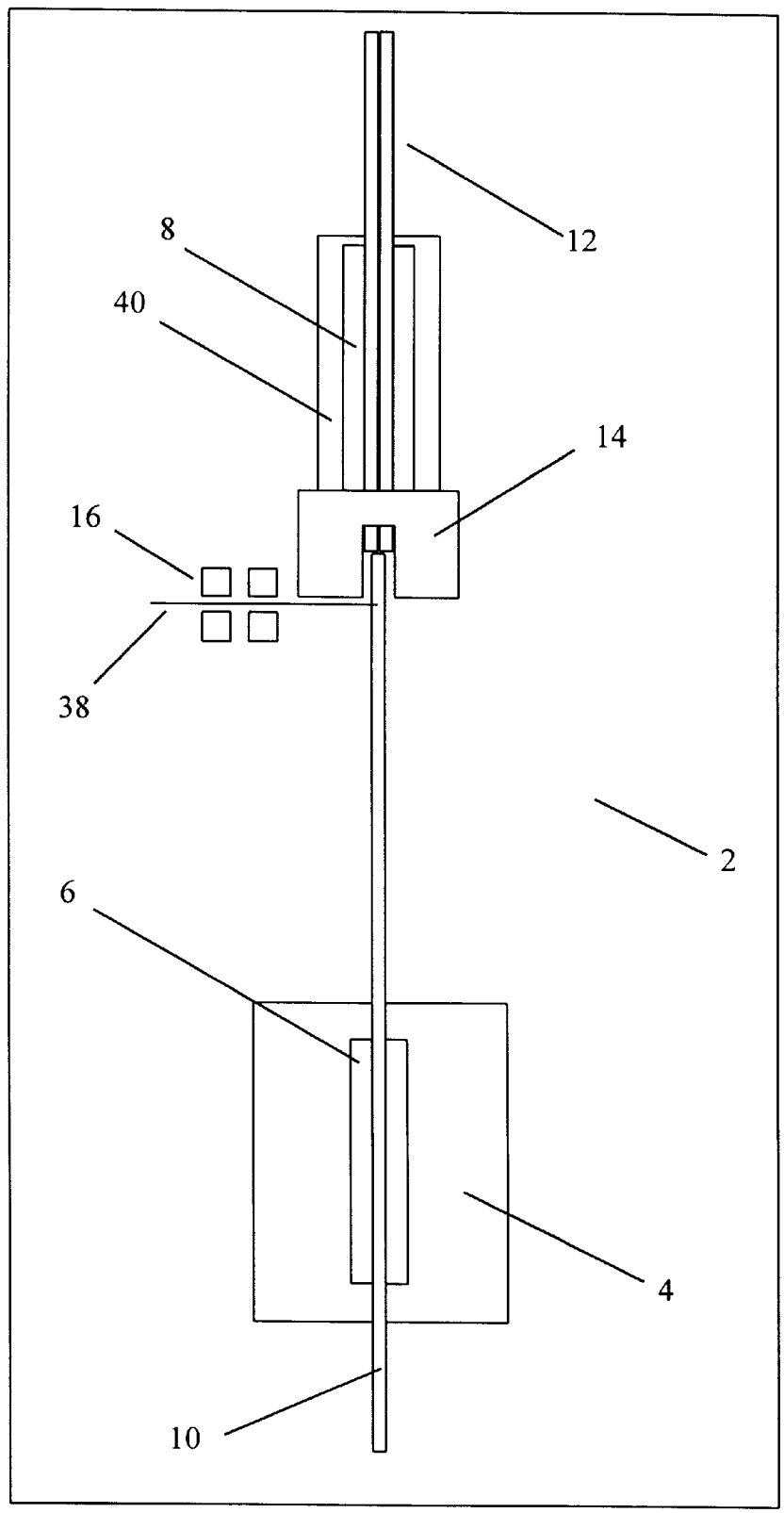
FIG. 8 is an overhead view of a switch having one bumper and shims to raise the grippers on the substrate wherein the second gripper is attached to the bumper, the pole optical fiber meets one of the throw fibers within the bumper, and the means for alternately positioning the pole fiber with a throw fiber engages the pole fiber between the bumper and the first gripper.

In FIG. 8, the raised central portion of the substrate 4, is accomplished with a shim which attaches around and within the grove of gripper 6. In this case the strips of gripper 6 are fixed directly to the substrate 2. Likewise a shim 40 is attached around and within gripper 8, which is attached to the substrate 2. The shims 4 and 40 raise the fibers 10 and 12 above the substrate. The bumper 14 is constructed as a single piece with an opening through which the fibers 10 and 12 can pass. The side walls of this opening are undercut such that the walls are further apart near the substrate. The bumper 14 is fixed to the gripper 8 such that each of the side walls of the opening touch one of the two fibers 12. The pole fiber 10 extends within the opening of bumper 14.

Figure 9:
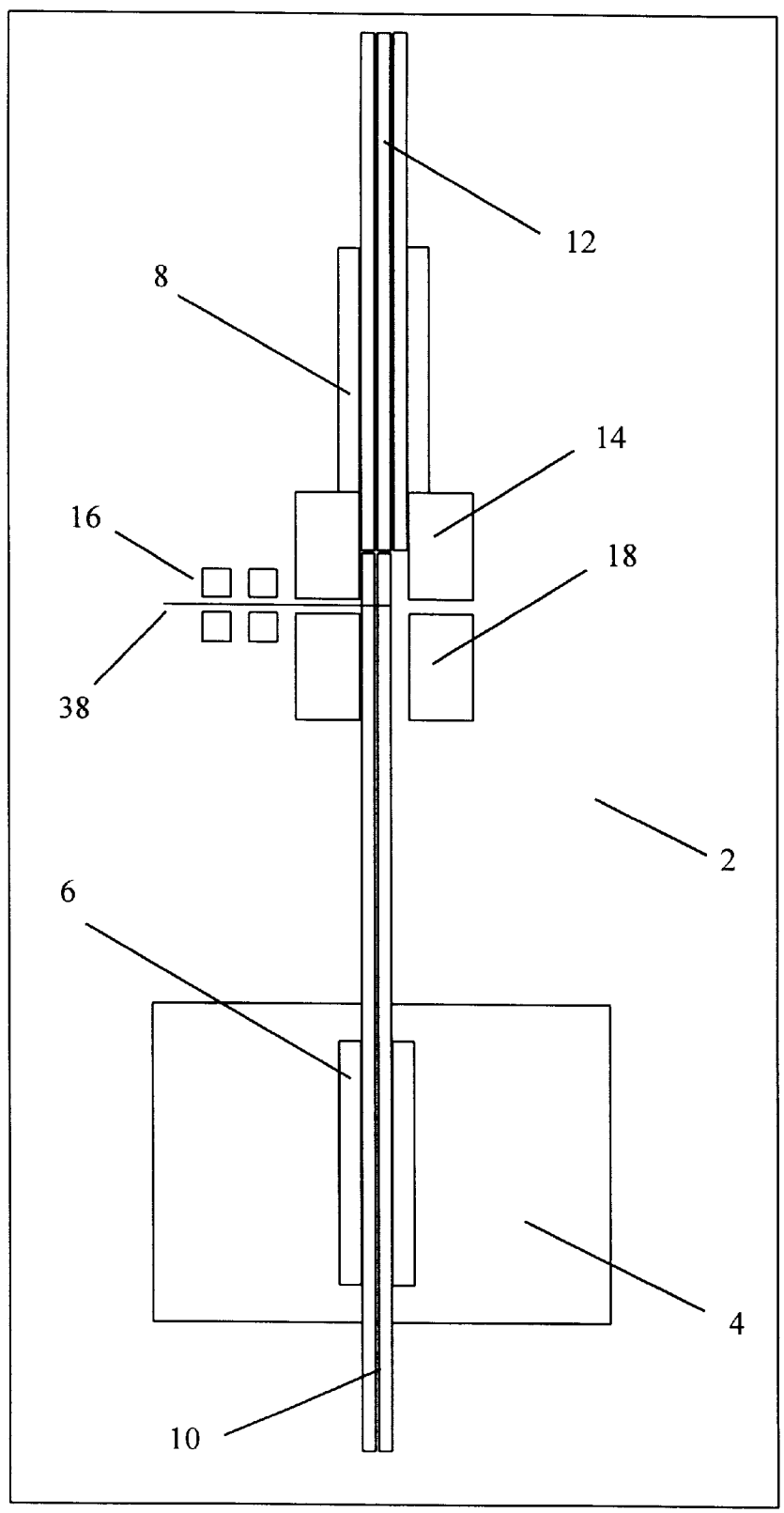
FIG. 9 is an overhead view of an embodiment similar to the embodiment shown in FIG. 1 but having two pole optical fibers and three throw optical fibers.

In FIG. 9 is shown an overhead view of an embodiment similar to the embodiment shown in FIG. 1 but having two pole optical fibers 10 and three throw optical fibers 12. The two pole optical fibers 10 are attached to one actuator 39 having an arm 38.

Figure 10:
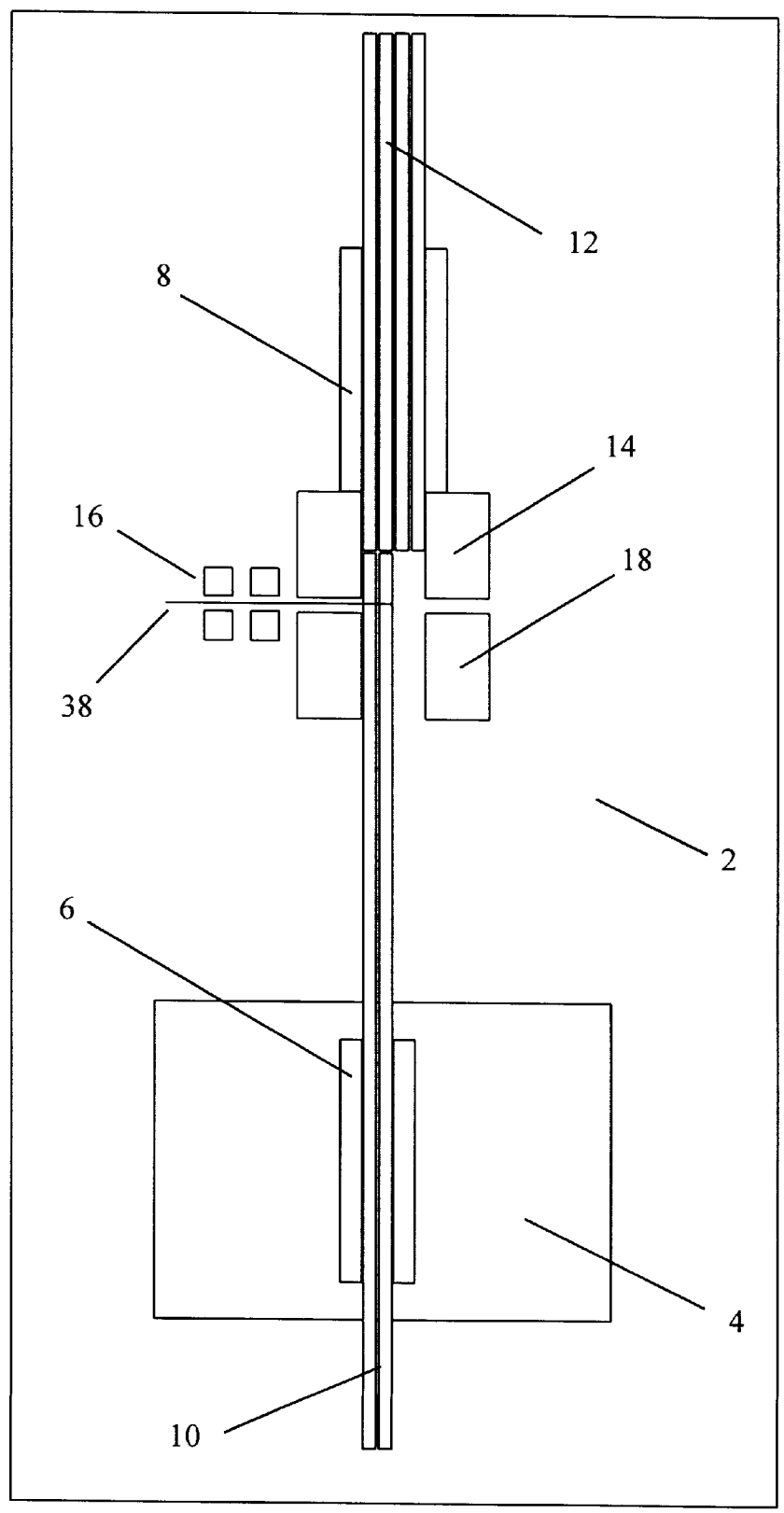
FIG. 10 is an overhead view of an embodiment similar to the embodiment shown in FIG. 9 but having two pole optical fibers and four throw optical fibers.

FIG. 10 is an overhead view of an embodiment similar to the embodiment shown in FIG. 9 but having two pole optical fibers 10 and four throw optical fibers 12. The two pole optical fibers 10 are attached to one actuator 39 having an arm 38.

In the preferred embodiments of this invention, each of the grippers 6 and 8, bumper 14 and optional bumper 18, and posts 16 are simultaneously lithographically formed on the substrate. It is also possible to form pairs of components such as grippers and bumpers or grippers and posts together and then subsequently to fabricate or attach the third element which can be aligned in reference to the previously fixed components. For example, with reference to FIG. 8, a bumper element can be attached to a previously fabricated gripper and aligned with a set of previously attached fibers.

Each of these polymeric elements are preferably formed using well known lithographic processes using photopolymerizable compositions and the like. First, a photopolymerizable composition is substantially uniformly deposited onto a surface of substrate 2. Next, the photopolymerizable composition is imagewise exposed to actinic radiation with either a laser linked to a computer-controlled x-y stage, which will expose precise areas of the composition with an ultraviolet laser beam, or a photomask having a pattern of substantially transparent and substantially opaque areas. The nonimage areas are then removed with a solvent, such as methanol or acetone, while leaving the image areas in the forms of the polymeric elements on the substrate 2. The polymeric elements must be accurately positioned so that arm 38 can precisely position pole fiber 10 relative to throw fibers 12. Therefore, it is preferred that the polymeric grippers, bumpers and posts are fabricated with the same photomask in the same step, or in the case of sequentially laser-written structures, the writing should preferably be done in a single session without demounting the substrate from the x-y stage.

In another embodiment, the polymeric elements are formed by using a soft embossing tool to emboss a pattern in a polymerizable composition in the form of the polymeric elements on the substrate. The composition is then cured and the embossing tool is removed. The flexibility of the tool and/or the polymeric elements must be sufficient so that the tool can be removed from the cured polymer without damaging the polymeric elements. The tool is preferably comprised of silicone compounds. The polymerizable composition may be curable by various means, such as with actinic radiation or heat, and should have a viscosity sufficient to conform to the raised features of the tool. After removing the tool from the cured composition the elements will remain on the substrate. The embossed pattern may include a plurality of arrays for multiple switches, if desired.

Suitable photopolymerizable compositions include photopolymers formed by the photo-polymerization of a monomer or mixtures of such monomers with a suitable photoinitiator such as epoxies, urethane acrylates and methacrylates, ester acrylates and methacrylates, epoxy acrylates and methacrylates, polyethylene glycol acrylates and methacrylates, vinyl ethers and other vinyl containing organic monomers and mixtures of the above. Illustrative of such acrylate and methacrylate monomers are aryl diacrylates or methacrylates, triacrylates or methacrylates and tetra acrylates or methacrylates as for example mono-di,-tri- and tetraacrylates or methacrylates of benzene, naphthalene, bisphenol-A, biphenylene, methane biphenylene, di(trifluoromethyl)methane biphenylene, phenoxyphenylene and the like.

Useful monomers also include aliphatic acrylates, diacrylates, triacrylates and tetraacrylates as for example, butyl acrylate, ethylhexyl acrylate, phenoxyethyl acrylate, β-carboxylethyl acrylate, isobornyl acrylate, tetrahydrofurfuryl acrylate, cyclohexyl acrylate, propylene glycol monoacrylate, 2-(2-ethoxyethoxy) ethyl acrylate, N-vinyl pyrrolidone, 1,6-hexanediol diacrylate or dimethacrylate, neopentyl glycol diacrylate, diethylene glycol diacrylate or dimethacrylate, triethylene glycol diacrylate or dimethacrylate, tetraethylene glycol diacrylate or dimethacrylate, polyethylene glycol diacrylate or dimethacrylate, dipropylene glycol diacrylate, tripropylene glycol diacrylate, ethoxylated neopentyl glycol diacrylate, propoxylated neopentyl glycol diacrylate, aliphatic diacrylate, alkoxylated aliphatic diacrylate, aliphatic carbonate diacrylate, trimethylolpropane triacrylate or trimethacrylate, pentaerythritol triacrylate, ethoxylated trimethylolpropane triacrylate, propoxylated trimethylolpropane triacrylate, glyceryl proxylated triacrylate, tris (2-hydroxyethyl) isocyanurate triacrylate, pentaerythritol tetraacrylate, dipentaerythritol pentaacrylate, ditrimethylolpropane tetraacrylate, alkoxylated tetraacrylate.

The most preferred monomers include trimethylolpropane triacrylate, pentaerythritol triacrylate, ethoxylated trimethylolpropane triacrylate, glyceryl proxylated triacrylate, pentaerythritol tetraacrylate, dipentaerythritol pentaacrylate, ditrimethylolpropane tetraacrylate, methyl methacrylate, n-butyl acrylate, 2-ethylhexyl acrylate, isodecyl acylate, 2-hydroxyethyl acrylate, 2-hydroxypropyl acrylate, cyclohexyl acrylate, 1,4-butanediol diacrylate, ethoxylated bisphenol A diacrylate, neopentylglycol diacrylate, diethyleneglycol diacrylate, diethylene glycol dimethacrylate, 1,6-hexanediol diacrylate, and pentaerythritol tetra-acrylate.

Especially useful are mixtures wherein at least one monomer is a multifunctional monomer such as a diacrylate or triacrylate, as these will produce a network of crosslinks within the reacted photopolymer. The preferred monomer mixtures for use in the method of the invention are mixture of 33% urethane acrylate and 67% 1,6-hexanediol diacrylate; and the mixture of 67% ethoxylated bisphenol A diacrylate and 33% trimethylol propane triacrylate.

The polymer preferably is a polymer with a molecular weight equal to or greater than about 50,000 and more preferably equal to or greater than 100,000. In the most preferred embodiment of this invention, the polymer material is a photo-polymer which is a crosslinked polymer above its gel point, that is, the molecular weight is essentially infinite. The polymer should be largely amorphous (less than 30% crystallinity) rather than crystalline and its glass transition temperature ($T_g$) should be less than its use temperature in order to ensure that there is a high degree of chain segment mobility.

It is preferred that the crystallinity of the polymer is less than about 25% and more preferred that the crystallinity is less than about 10% in order to preserve a high degree of toughness in the polymer.

A wide variety of photoinitiators are suitable for use in initiating polymerization by UV light in the monomer mixtures. Preferred photoinitiators are those which are soluble in the preferred monomers and which have useful absorption at the wavelengths of light chosen for irradiation. If the necessary unique geometry of the photopolymer element is to be provided by the establishment of a gradient of photoinitiation events through the thickness of the monomer layer, then it is important that the layer has significant optical absorption at the irradiating wavelength. If the optical absorption of the constituent monomers is small at these wavelengths the requisite absorption may be provided by the photoinitiator. Combinations of several photoinitators are useful to broaden wavelength sensitivity or to increase loading solubility or to match the photospeed of the monomer system to the particular light source to be employed. Especially useful include 2-hydroxy-2-methyl-1-phenyl-propan-1-one (Darocur 1173), 2,2-dimethoxy-2-phenylacetophenone (Irgacure 651) and 1-hydroxycyclohexyl phenyl ketone sensitized 1:1 with benzophenone (Irgacure 500). An especially preferred mixture of photoinitiators is a 1:1:1 mixture of these three sensitizers.

The amount of initiator which is useful in the photomonomer mixtures is dependent on the desired photo speed at the available optical power present in the source of irradiation and on the desired wall angle and thickness of the polymeric positioning element. In general, less initiator is required for a high brightness, focused source such as a scanned laser beam and more is required for a low brightness source such as a mercury lamp which has been spread out to cover a large area. Useful loadings of photoinitiators, by percent weight of the total monomer mixture layer, are 0.1 to 10% with a preferred range of 0.5 to 8% and a most preferred range of 1 to 4%.

The polymer which makes up the polymeric elements preferably contains a number of crosslinks to prevent overall movement of the polymer chains and thus restore the necessary geometry of grippers 6 and 8 after the introduction of optical fibers into the grippers. This recovery of the shape of grippers 6 and 8 is associated with the properties of resilience of an elastomeric polymer. In the preferred case, wherein the polymer material is a crosslinked polymer above its gel point, there is, of necessity, a minimum of one primary chemical bond crosslink per polymer chain. In the more preferred compositions at least one of the reactive monomers is a multifunctional monomer, that is, it contains two or more reactive functionalities on the same molecule. When such a multifunctional monomer is present as a major component of the monomer mixture then the resulting polymer will be much more extensively crosslinked and there will be many crosslinks per polymer chain.

The tensile strengths which are displayed by polymers useful in the invention preferably range from about 100 to about 850 kg cm$^2$ with the more preferred range being from about 150 to about 300 kg cm$^2$. The percent elongation of the crosslinked photopolymers useful in the method of the invention preferably ranges from about 2 to about 300% with the more preferred range being about 2 to about 50% due to the increased level of crosslinking in the more preferred compositions. Useful values of hardness preferably range from about 20 to about 200 (pendulum hardness) with more preferred values being from about 40 to about 150 s.

Once polymerized, the polymeric elements must be flexible to provide some degree of elastic strength to deform under the applied stress when optical fibers are inserted into the grippers. Also the polymer should not be overly brittle or it will be damaged by the insertion, nor can it be overly hard or it may cause damage to an optical fiber. However, the deformation should not be permanent and the gripper should as rapidly as possible return or substantially return to its original dimensional shape in order to provide for a useful retaining force on the optical fiber.

The grippers 6 and 8, and preferably bumper 14 and optional bumper 18, have an undercut shape that allows them to provide a downward force on an optical fiber as opposed to just providing horizontal alignment of a fiber. The grippers and bumpers each comprise adjacent parallel, polymeric strips. Each of the polymeric strips has a base attached to a surface of substrate 2, a top surface in a plane parallel to the plane of substrate 2, and side walls which form a groove or opening between the strips. A portion of the surface of the substrate or a shim forms a floor of the groove. Each of the grippers and bumpers having an undercut shape is fabricated such that the groove or opening has a width at the base of the element which is greater than a width at the top surface of the element. For the grippers 6 and 8 and preferably for the bumpers 14 and 18, it is preferred that the width of the groove or opening at a cross-section higher than and approximately equal to one-half the diameter of the fiber is less than the width of the groove or opening at a cross section at a height of less than and approximately equal to one-half of the diameter of the fiber.

The grippers 6 and 8 may optionally comprise more than two polymeric strips when the number of fibers secured by the grippers is two or greater. Once the polymeric elements are formed, it is straightforward to insert optical fibers into the array by, for example, fixing a pole optical fiber 10 into gripper 6 and fixing a pair of throw optical fibers 12 into grippers 8 by juxtapositioning the fibers into the grooves of the grippers. The optical fibers are positioned such that the light signal carrying core of pole fiber 10 may be alternately aligned in optical alignment or substantially in optical alignment with the light carrying core of a throw fiber 12 such that light can be propagated from the core of the pole optical fiber through the core of a throw fiber with minimal loss of optical data. To ensure minimal loss, the ends of the fibers 10 and 12 should be complementary to each other. If the ends of the fibers are not already complementary, the ends may be cleaved at complementary angles, such as an angle perpendicular to the substrate 2 or at an angle ranging from about 6° to about 10°, to achieve an alignment allowing good performance.

In order to ensure that the fibers may closely approach each other at their endfaces without touching during the operation of the switch, fibers with angled endfaces should be adjusted by rotation about their axis such that the normal (perpendicular line) from each of their endfaces are parallel to each other and perpendicular to the direction of motion of the pole fiber (that is, perpendicular to the arm 38). Also, the ends of the optical fibers may optionally be immersed in a refractive index matching fluid to reduce the loss of optical power during the transmission of signals between two fibers. The ends of the optical fibers are preferably separated by a distance of about 10 $\mu$m or less, more preferably about 5 $\mu$m or less, and most preferably about 1 $\mu$m or less. The optical fibers may be conventional single mode fibers, polarization-preserving fibers, multi-mode fibers or cable, UV-NIR transmissive fiber cable, hard polymer clad fiber cable or single mode optical fibers having expanded cores at their endfaces.

On substrate 2, the strips forming gripper 6, when a single pole fiber with a diameter of 125 $\mu$m is employed, are preferably separated by a center-to-center distance of from about 160 $\mu$m to about 250 $\mu$m, and more preferably from about 180 $\mu$m to about 220 $\mu$m. The most preferable center-to-center separation is about 200 $\mu$m. The height of the strips forming each gripper may range from about 70 $\mu$m to about 130 $\mu$m tall, and more preferably from about 100 $\mu$m to about 120 $\mu$m tall. The width of the groove between each undercut gripper at the upper surface of the strips may range from about 100 $\mu$m to about 120 $\mu$m, and more preferably from about 105 $\mu$m to about 115 $\mu$m, and at the bottom surface of the strips the width of the groove may range from about 120 $\mu$m to about 140 $\mu$m and more preferably from about 125 $\mu$m to about 135 $\mu$m. The length of the strips is preferably from about 0.1 to about 20 mm and is most preferably from about 1 to about 10 mm.

One may optionally design the grippers to contain more than one fiber. For instance two pole fibers may be held with gripper 6, or 3 throw fibers may be held by gripper 8. When more than one fiber is to be held the width of the groove between gripper elements must be increased accordingly. For example, in the case of 125 $\mu$m diameter fibers the width should be increased above that recommended for a single fiber by 125 $\mu$m times n−1, where n is the number of fibers. When the number of fibers held by the gripper is equal to or greater than two, more than two polymeric strips may be optionally used to hold each fiber individually.

Each actuator for alternately positioning an end of a pole optical fiber with an end of one of the throw fibers comprises a bidirectional micromechanical actuator including arms 38 and 40. This actuator may be driven against a spring restoring force or may be preferably actively driven in either of two opposite directions. Micromechanical actuators are well known in the art and are described, for example, in U.S. Pat. No. 5,808,384. Micromechanical actuators are typically made using an X-ray lithography process known as LIGA, with polymethyl methacrylate (PMMA) as the X-ray photoresist and an aqueous developing system. The LIGA process and the use of PMMA is described, for example, in U.S. Pat. No. 5,378,583. In the most preferred embodiments only four components of the actuator are fabricated with the LIGA process, including a coil mandrel and spring/pad assembly, which carry magnetic flux and therefore must be made of permalloy, or other ferromagnetic material, through the LIGA process. Shims and the arms also must be made through the LIGA process, because they require very precise and well controlled dimensions, achievable only through the LIGA process. Other alternative methods of fabrication include forming the alignment bumpers out of a metal, such as permalloy, using the LIGA process, forming the shims out of PMMA or other polymer or metal other than permalloy, and using a LIGA-fabricated metal alignment tube to regulate the throw length of the actuator and pole fiber instead of polymeric alignment bumpers. Optionally, thermal epoxies or UV-curing adhesives may be used to permanently attach LIGA components to the polymeric posts, and optical fibers to the substrate.

Substrate 2 preferably has a planar surface and can be any solid material used in the formation of substrates for conventional optical devices. Desired characteristics of these materials include mechanical and optical stability at typical operating temperatures of the device, and it is preferably a wafer having an oxide layer of about 2 $\mu$m or less. Preferred materials for use in the fabrication of substrate 2 include printed circuit board material, polymers, quartz, glass, semiconductor wafer, inorganic crystals and silicon. The most preferred substrate materials are silicon and quartz. Substrate 2 is preferably primed with an appropriate coupling agent to improve adhesion of the polymeric elements. Suitable coupling agents include silanes such as acryloxypropyltrichlorosilane.

When the plateau 4 is to be made from a UV curable material, it is made before the grippers out of the same UV curable material but is not completely cured. Improved adhesion between the grippers and the plateau results when the grippers and the plateau are later fully cured together. The height of the plateau or the shim 4 ranges from about 2 μm to about 100 μm, and more preferably from about 5 μm to about 50 μm, and most preferably from about 5 μm to 25 μm. The pole fiber 10 cantilevers over the substrate and is initially positioned at a neutral position of from about 2 μm to about 25 μm over throw fibers 12. When means 39 and arm 38 pulls or pushes pole fiber 10 against the undercut alignment bumpers, the fiber is diverted down toward the substrate 2 and nestles into two-point contact against the substrate or an optional shim and alignment bumpers and into alignment with the optical core of one of the throw fibers 12. The width of the bumpers, including both strips and the space between, ranges from about 350 μm to about 1 mm, and more preferably from about 400 μm to about 800 μm, the height of the bumpers ranges from about 70 μm to about 1000 μm, and more preferably from about 70 μm to about 400 μm when two throw fibers are used. The length of the bumpers ranges from about 50 μm to about 0.5 μm, and more preferably from about 100 μm to about 1 mm. The height of the posts ranges from about 80 μm to about 500 μm tall. Most preferably the height of the posts is such as to allow from about 90 μm to about 110 μm of the post to extend above the substrate or a shim. The base dimensions of the posts depend directly on the requirements of the actuator. Optionally, a polymer plateau may be placed under each post to replace the need for a shim to raise the moving portions of the actuator above the substrate.

An ultra-violet or thermally curable adhesive may optionally be used to glue the optical fibers into the grippers and to glue the actuator onto the posts. A preferred UV curable adhesive, such as commercially available Norland 81, will cure into a hard, crosslinked polymer and will adhere well to a glass or silicon substrate, and to the polymeric posts. Index matching fluid may optionally be applied to the ends of the fibers or it may flood the entire device.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives which have been discussed above and all equivalents thereto.

What is claimed is:

1. A micro-optic switch comprising:
a) a planar substrate;
b) at least one array comprising:
first and second optical fiber grippers on the substrate, each of the grippers having a central groove and the first and second optical fiber grippers being positioned such that the grooves are substantially collinear; and
an optical fiber alignment bumper on the substrate having a central groove, being positioned such that the groove is substantially collinear with the grooves of the first and second optical fiber grippers;
c) at least two horizontally spaced throw optical fibers fixed in the groove of each second optical fiber gripper; and
d) at least one pole optical fiber fixed in each first optical fiber gripper such that it cantilevers over the substrate and extends at least part of the way through the groove of the alignment bumper, such that an end thereof is capable of alternate positioning in alignment with a complementary end of one of the throw fibers.

2. The micro-optic switch of claim 1 further comprising at least one additional array adjacent to said array; at least two horizontally spaced throw optical fibers fixed in the groove of the second optical fiber gripper of the at least one additional array; at least one pole optical fiber fixed in the first optical fiber gripper of the at least one additional array such that it cantilevers over the substrate and extends at least part of the way through the groove of the alignment bumper of the at least one additional array, such that it is capable of alternate positioning with a complementary end of one of the throw fibers in the at least one additional array; and wherein said pole optical fibers are connected such that the movement of the pole fibers correspond to one another.

3. The micro-optic switch of claim 1 wherein the end of the pole optical fiber alternately aligns with a complementary end of one of the throw fibers within the alignment bumper.

4. The micro-optic switch of claim 1 wherein the end of the pole optical fiber alternately aligns with a complementary end of one of the throw fibers within a space between the alignment bumper and the second optical fiber gripper.

5. The micro-optic switch of claim 1 wherein each array further comprises a second optical fiber alignment bumper on the substrate between the first optical fiber gripper and the alignment bumper, the second optical fiber alignment bumper having a central groove and being positioned such that the groove is substantially collinear with the groove of the optical fiber alignment bumper, and wherein the pole optical fiber extends through the second optical fiber alignment bumper.

6. The micro-optic switch of claim 1 further comprising means for alternately positioning the end of the pole optical fiber with the end of one of the throw fibers.

7. The micro-optic switch of claim 2 further comprising means for alternately positioning the end of the pole optical fibers with an end of one of the corresponding throw fibers.

8. The micro-optic switch of claim 4 further comprising means for engaging the pole optical fiber at opposite sides of the alignment bumper for alternately positioning the end of the pole optical fiber with an end of one of the throw fibers.

9. The micro-optic switch of claim 5 further comprising means for engaging the pole optical fiber between the alignment bumper and the second alignment bumper for alternately positioning the end of the pole optical fiber with an end of one of the throw fibers.

10. The micro-optic switch of claim 1 further comprising means mounted on the substrate for alternately positioning the end of the pole optical fiber with an end of one of the throw fibers.

11. The micro-optic switch of claim 6 wherein the means for alternately positioning an end of the pole optical fiber with an end of one of the throw fibers comprises a bidirectional micromechanical actuator.

12. The micro-optic switch of claim 10 wherein the means for alternately positioning an end of the pole optical fiber with an end of one of the throw fibers comprises a bidirectional micromechanical actuator mounted on the substrate.

13. The micro-optic switch of claim 12 wherein the bidirectional micromechanical actuator is mounted on a plurality of polymeric posts which are mounted on the substrate.

14. The micro-optic switch of claim 1 further comprising a plurality of polymeric posts which are mounted on the substrate.

15. The micro-optic switch of claim 1 wherein each gripper comprises a pair of parallel, polymeric strips each having a base attached directly or indirectly to the substrate, a top surface in a plane parallel to the substrate, and side walls which form a groove between adjacent strips wherein the groove has a width at the base of each gripper which is greater than a width of the groove at the top surface of the gripper.

16. The micro-optic switch of claim 1 wherein said bumper comprises a pair of parallel, polymeric strips each having a base attached to the substrate, a top surface in a plane parallel to the substrate, and side walls which form a groove between adjacent strips wherein the groove has a width at the base of each bumper which is greater than a width of the groove at the top surface of the bumper.

17. The micro-optic switch of claim 1 wherein said bumper comprises a metal.

18. The micro-optic switch of claim 1 wherein said bumper is attached to said second gripper.

19. The micro-optic switch of claim 1 wherein said bumper and said gripper comprise the same material.

20. The micro-optic switch of claim 1 wherein said pole optical fiber and said throw optical fibers are single mode optical fibers.

21. The micro-optic switch of claim 1 wherein said pole optical fiber and said throw optical fibers are single mode optical fibers having expanded cores and the expanded core of the pole optical fiber is alternately juxtaposed with the expanded core of one of said throw optical fibers.

22. The micro-optic switch of claim 1 wherein the ends of said pole optical fiber and said throw optical fibers are immersed in a refractive index matching fluid.

23. The micro-optic switch of claim 1 wherein the ends of said pole optical fiber and said throw optical fibers are cut at an angle of from about 6° to about 10°.

24. A process for producing a micro-optic switch comprising:
a) providing a planar substrate; and
b) forming at least one array comprising:
lithographically forming first and second optical fiber grippers on the substrate, each of the grippers having a central groove and the first and second optical fiber grippers being positioned such that the grooves are substantially collinear; and
simultaneously lithographically forming an optical fiber alignment bumper on the substrate having a central groove, being positioned such that the groove is substantially collinear with the grooves of the first and second optical fiber grippers.

25. The process of claim 24 further comprising:
d) fixing at least two horizontally spaced throw optical fibers in the groove of the second optical fiber gripper; and
e) fixing at least one pole optical fiber in the first optical fiber gripper such that it cantilevers over the substrate and extends at least part of the way through the groove of the alignment bumper, such that an end thereof is capable of alternate positioning in alignment with a complementary end of one of the throw fibers.

26. The process of claim 25 further comprising forming at least one additional array adjacent to said array; fixing at least two horizontally spaced throw optical fibers in the groove of the second optical fiber gripper of the at least one additional array; fixing at least one pole optical fiber in the first optical fiber gripper of the at least one additional array such that it cantilevers over the substrate and extends at least part of the way through the groove of the alignment bumper of the at least one additional array, such that it is capable of alternate positioning with a complementary end of one of the throw fibers in the at least one additional array; and wherein the said pole optical fibers are connected such that the movement of the pole fibers correspond to one another.

27. The process of claim 24 further comprising lithographically forming in each array a second optical fiber alignment bumper on the substrate, between the first optical fiber gripper and the alignment bumper, having a central groove and being positioned such that the groove is substantially collinear with the groove of the optical fiber alignment bumper.

28. The process of claim 25 further comprising connecting a means to the pole fiber for alternately positioning the end of the pole optical fiber with an end of one of the throw fibers.

29. The process of claim 28 wherein the means for alternately positioning an end of the pole optical fiber with an end of one of the throw fibers comprises a bidirectional micromechanical actuator.

30. The process of claim 24 further comprising lithographically forming a plurality of polymeric posts on the substrate.

31. The process of claim 30 wherein the grippers, bumper and polymeric posts are formed simultaneously.

32. The process of claim 30 further comprising connecting a means to the polymeric posts and to the pole fiber for alternately positioning the end of the pole optical fiber with an end of one of the throw fibers.

33. The process of claim 24 wherein each gripper comprises a pair of parallel, polymeric strips each having a base attached directly or indirectly to the substrate, a top surface in a plane parallel to the substrate, and side walls which form a groove between adjacent strips wherein the groove has a width at the base of each gripper which is greater than a width of the groove at the top surface of the gripper.

34. The process of claim 28 wherein said bumpers comprise a pair of parallel, polymeric strips each having a base attached to the substrate, a top surface in a plane parallel to the substrate, and side walls which form a groove between adjacent strips wherein the groove has a width at the base of each bumper which is greater than a width of the groove at the top surface of the bumper.

35. A process for switching the path of an optical signal which comprises:
A) providing a micro-optic switch comprising:
a) a planar substrate;
b) at least one array comprising:
first and second optical fiber grippers on the substrate, each of the grippers having a central groove and the first and second optical fiber grippers being positioned such that the grooves are substantially collinear; and
an optical fiber alignment bumper on the substrate having a central groove, being positioned such that the groove is substantially collinear with the grooves of the first and second optical fiber grippers;
c) at least two horizontally spaced throw optical fibers fixed in the groove of each second optical fiber gripper;
d) at least one pole optical fiber fixed in each first optical fiber gripper such that it cantilevers over the substrate and extends at least part of the way through the groove of the alignment bumper, such that an end thereof is capable of alternate positioning in alignment with a complementary end of one of the throw fibers; and
e) means for alternately positioning the end of the pole optical fiber with an end of one of the throw fibers;
B) directing an optical signal through the pole optical fiber; and C) alternately positioning the end of the pole optical fiber with an end of one of the throw fibers.

36. The process of claim 35 wherein step (C) is conducted with a bidirectional micromechanical actuator.

37. The process of claim 36 wherein the bidirectional micromechanical actuator is mounted on a plurality of polymeric posts which are mounted on the substrate.

38. The process of claim 36 wherein each gripper comprises a pair of parallel, polymeric strips each having a base attached either directly or indirectly to the substrate, a top surface in a plane parallel to the substrate, and side walls which form a groove between adjacent strips wherein the groove has a width at the base of each gripper which is greater than a width of the groove at the top surface of the gripper.

39. The process of claim 36 wherein said bumpers comprise a pair of parallel, polymeric strips each having a base attached to the substrate, a top surface in a plane parallel to the substrate, and side walls which form a groove between adjacent strips wherein the groove has a width at the base of each bumper which is greater than a width of the groove at the top surface of the bumper.

* * * * *